(12) United States Patent
Lowrey

(10) Patent No.: US 11,931,880 B2
(45) Date of Patent: Mar. 19, 2024

(54) GATE HOLDING DEVICE AND METHOD

(71) Applicant: WIREMAN PTY LIMITED, New South Wales (AU)

(72) Inventor: Ian Lowrey, New South Wales (AU)

(73) Assignee: WIREMAN PTY LIMITED, New South Wales (AU)

( * ) Notice: Subject to any disclaimer, the term of this patent is extended or adjusted under 35 U.S.C. 154(b) by 45 days.

(21) Appl. No.: 17/760,401

(22) PCT Filed: Feb. 9, 2021

(86) PCT No.: PCT/AU2021/050105
§ 371 (c)(1),
(2) Date: Aug. 26, 2022

(87) PCT Pub. No.: WO2021/159171
PCT Pub. Date: Aug. 19, 2021

(65) Prior Publication Data
US 2023/0068225 A1    Mar. 2, 2023

(30) Foreign Application Priority Data

Feb. 10, 2020  (AU) .............................. 2020900353
Apr. 3, 2020   (AU) .............................. 2020901041
Oct. 12, 2020  (AU) .............................. 2020903688

(51) Int. Cl.
*B25H 1/00*     (2006.01)
(52) U.S. Cl.
CPC ................... *B25H 1/0021* (2013.01)

(58) Field of Classification Search
CPC ............... B25H 1/0021; F16M 11/046; F16M 11/2021; F16M 11/04
See application file for complete search history.

(56) References Cited

U.S. PATENT DOCUMENTS 1,602,385 A * 10/1926 Bakenhus ............. E05C 17/443
                                                    292/338
6,739,093 B1 * 5/2004 Holbert ................ A01K 1/0017
                                                    256/73

(Continued)

FOREIGN PATENT DOCUMENTS

AU    2007200898 A1    9/2007

*Primary Examiner* — Jason L Vaughan
*Assistant Examiner* — Amanda Kreiling
(74) *Attorney, Agent, or Firm* — POLSINELLI PC

(57) ABSTRACT

A gate holding device for holding an agricultural gate (1) during installation is disclosed. The device (7, 57, 207) takes the form of an elongate attachment member defining a first axis and having a first hinge member (20, 70, 270) connected thereto adjacent a lower end of said attachment member, an elongate foot piece (8, 58, 208) defining a second axis substantially perpendicular to the first axis and having a second hinge member (21, 71, 121) connected to the foot piece intermediate the ends thereof and perpendicular to the second axis, the first and second hinge members being connected together to permit rotation of the foot piece relative to said attachment member between an initial position where the foot piece is substantially parallel to the gate and a final position in which the foot piece is substantially perpendicular to the gate. Preferably a pair of such devices is used. A method is also disclosed.

20 Claims, 11 Drawing Sheets

(56) References Cited

U.S. PATENT DOCUMENTS

| | | | |
|---|---|---|---|
| 7,506,860 B2* | 3/2009 | Stull | E06B 11/04 |
| | | | 256/73 |
| 2018/0141786 A1* | 5/2018 | Harrison, Jr. | B66C 5/025 |
| 2019/0323259 A1* | 10/2019 | DeLuso | E04H 17/1447 |

* cited by examiner

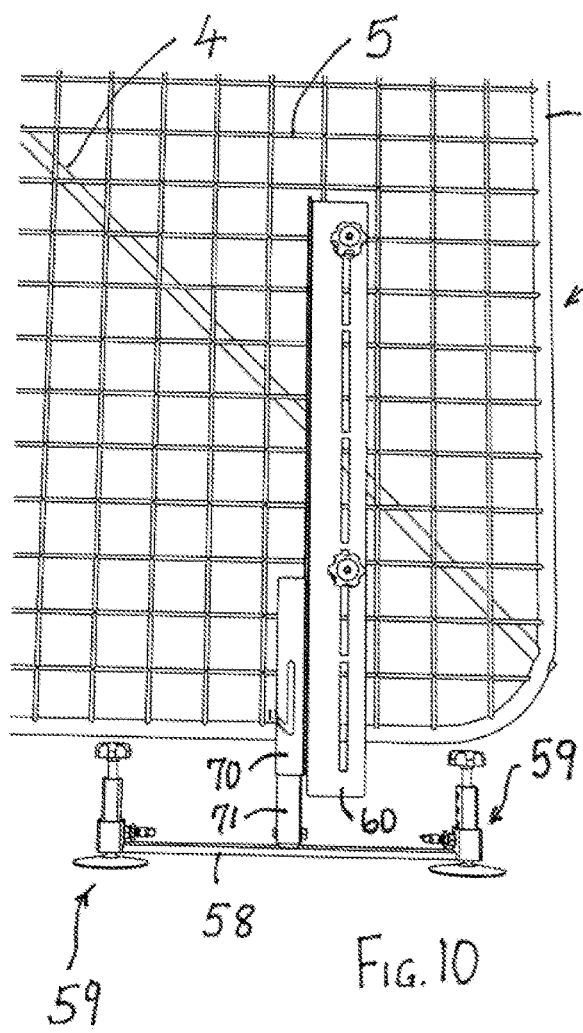
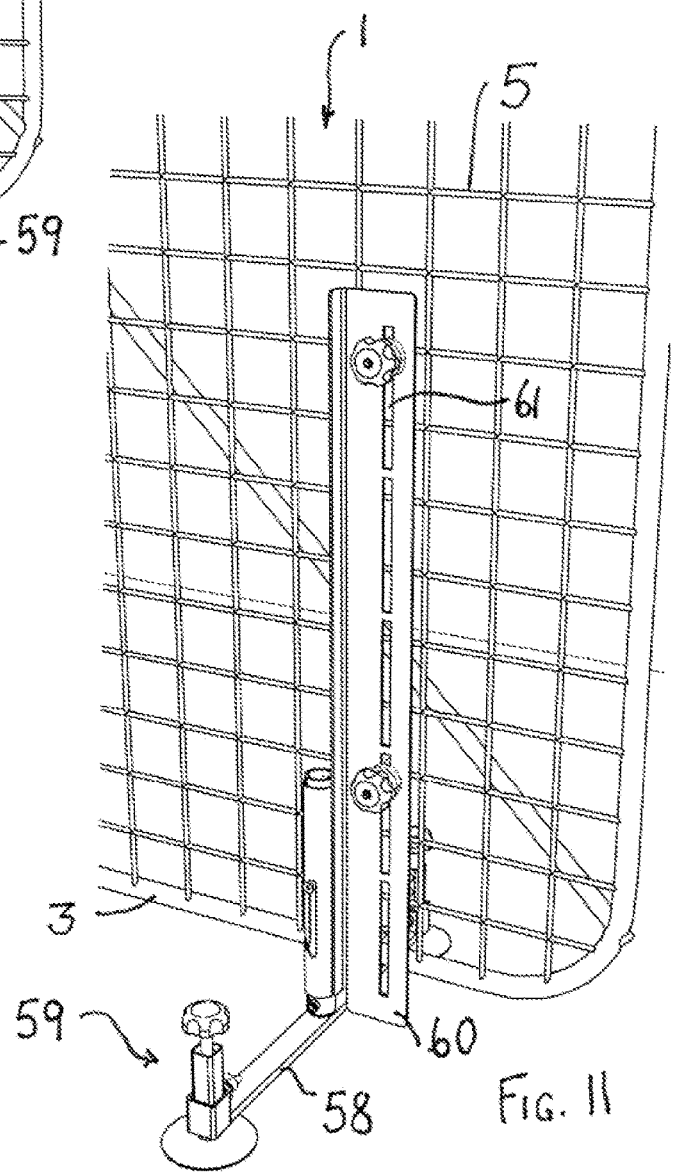

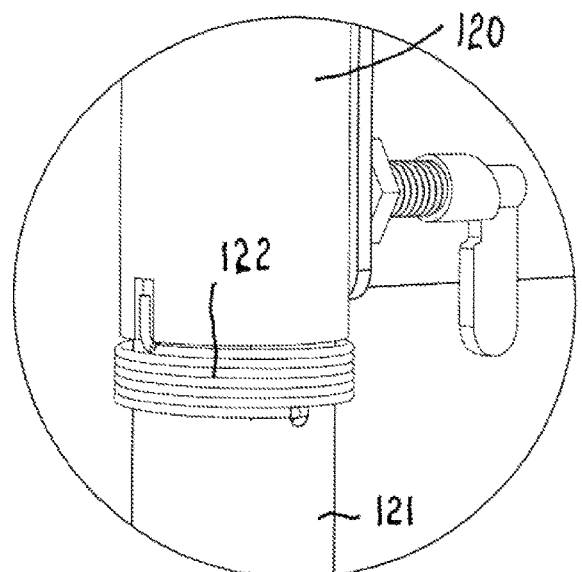
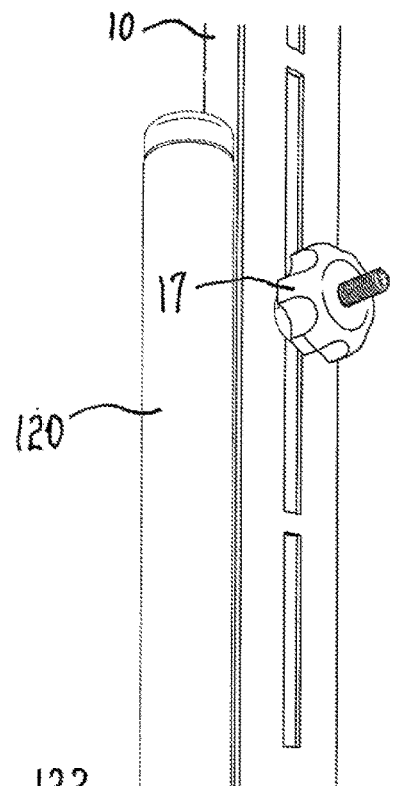
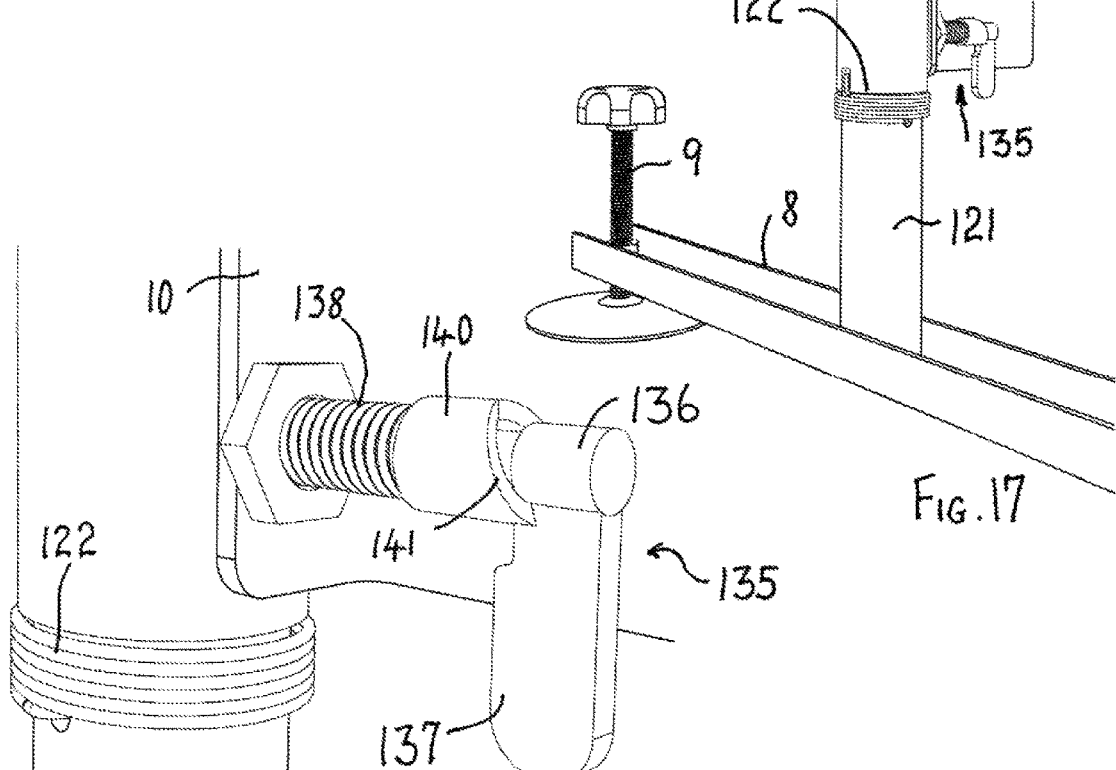
FIG. 18
FIG. 17
FIG. 19

GATE HOLDING DEVICE AND METHOD

CROSS REFERENCE TO RELATED APPLICATIONS

This application is a National Phase filing under 35 U.S.C. § 371 of PCT/AU2021/050105 filed on Feb. 9, 2021; which application in turn claims priority to Application No. 2020900343 filed in Australia on Feb. 10, 2020, Application No. 2020901041 filed in Australia on Apr. 3, 2020 and Application No. 2020903688 filed in Australia on Oct. 12, 2020. The entire contents of each application are hereby incorporated by reference.

FIELD OF THE INVENTION

The present invention relates to gates and, in particular, to the installation of agricultural gates.

BACKGROUND ART

Most agricultural gates are fabricated from galvanised pipe which is formed into a peripheral frame and an additional reinforcing or strengthening strut. This framework then has attached to it a body of steel mesh which provides further reinforcing. Some gates, particularly those constructed for equine activities, have substantial horizontal bars rather than steel mesh.

The gate is swung from a gate post which is either timber or steel and to which is attached gate hardware including a gudgeon. The gate hardware is attached to the gate post by various means including drilling, clamping and welding.

If two people are available for the gate installation, then one person can hold the gate in its intended final position, and the other person can manipulate the gate hardware.

However, if only a single person is available for the gate installation, considerable difficulties arise. In particular, it is difficult to prop up the gate in the intended final position and provide two hands free for the manipulation of the gate hardware.

GENESIS OF THE INVENTION

The Genesis of the present invention is a desire to at least ameliorate the above-mentioned problem and provide an apparatus and method to assist a single person during gate installation.

SUMMARY OF THE INVENTION

In accordance with a first aspect of the present invention there is disclosed a gate holding device for holding an agricultural gate during installation, said device comprising an elongate attachment member defining a first axis and having a first hinge member connected thereto adjacent a lower end of said attachment member, an elongate foot piece defining a second axis substantially perpendicular to said first axis and having a second hinge member connected to said foot piece intermediate the ends thereof and perpendicular to said second axis, said first and second hinge members being connected together to permit rotation of said foot piece relative to said attachment member between an initial position where said foot piece is substantially parallel to said gate and a final position in which said foot piece is substantially perpendicular to said gate.

In accordance with a second aspect of the present invention there is disclosed a method of holding an agricultural gate during installation, said method comprising the steps of:

attaching at least one gate holding device as defined in the previous paragraph to an agricultural gate lying in a substantially horizontal plane on ground adjacent a gate post, the foot piece of each of said gate holding device(s) being in said initial position, raising said agricultural gate into a substantially vertical plane with said foot piece(s) clear of said ground, moving the foot piece of each of said gate holding device(s) into said final position, and lowering said agricultural gate to engage said foot piece(s) with said ground.

Preferably there are two spaced apart gate holding devices.

BRIEF DESCRIPTION OF THE DRAWINGS

Several embodiments of the present invention will now be described, by way of example only, with reference to the accompanying drawings in which:

FIG. 10 is a plan view of one of the gate holding devices of FIG. 8, FIG. 11 is a perspective view of the gate holding device of FIG. 10 with its foot piece in the final position.

FIG. 17 is a partial perspective view of a gate holding device of a further embodiment.

FIG. 18 is an enlarged view of the spring of the gate holding device of FIG. 17, FIG. 19 is a perspective view of a lock mechanism of the gate holding device of FIG. 18.

DETAILED DESCRIPTION

Figure 1:
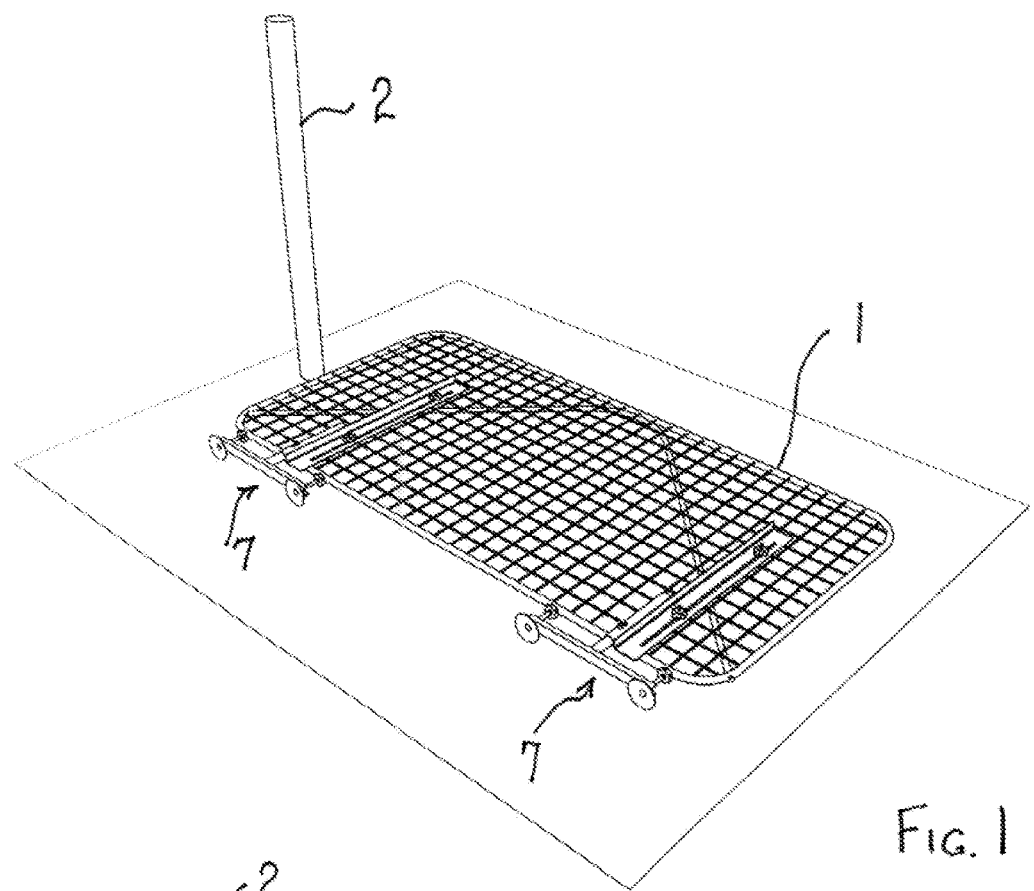
FIG. 1 is a perspective view of a gate to which two gate holding devices of a first embodiment are secured, the gate being in a horizontal position and the foot pieces being in the initial position.
Figure 2:
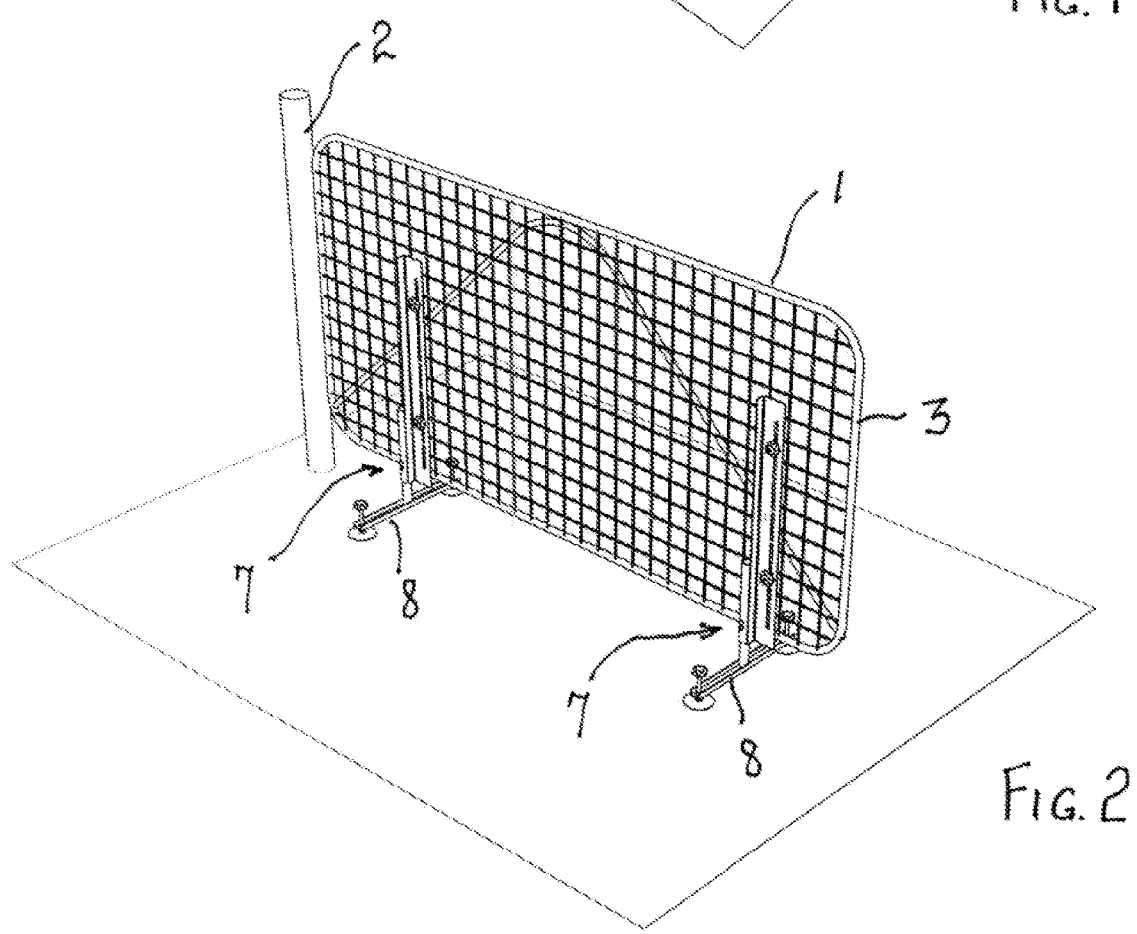
FIG. 2 is a perspective view of the gate of FIG. 1 in a vertical position and the foot pieces being in the final position.
Figure 3:
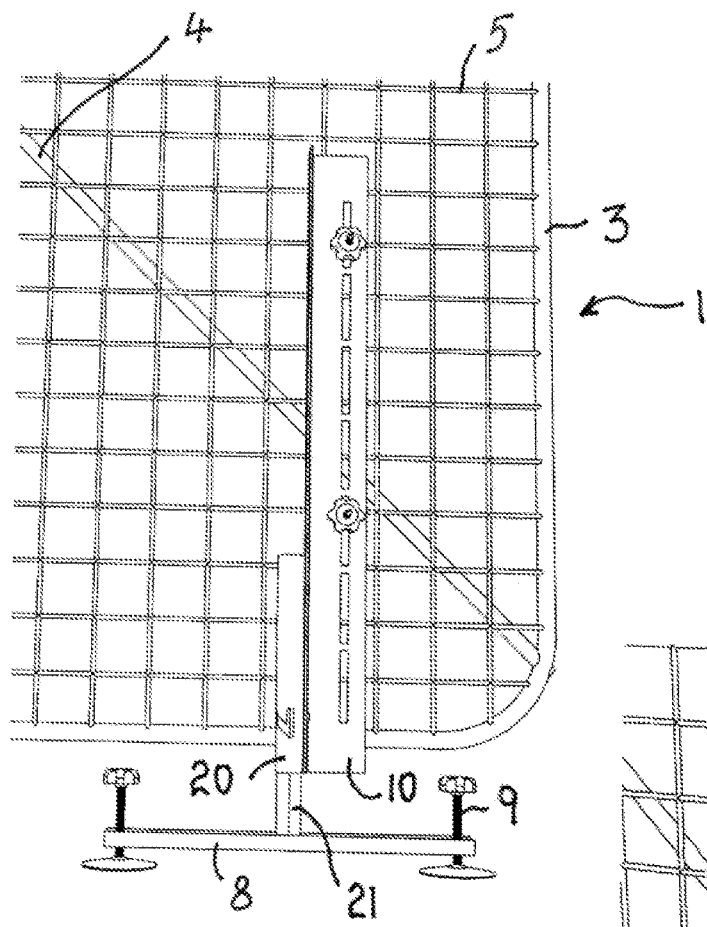
FIG. 3 is a plan view of one of the gate holding devices of FIG. 1.
Figure 4:
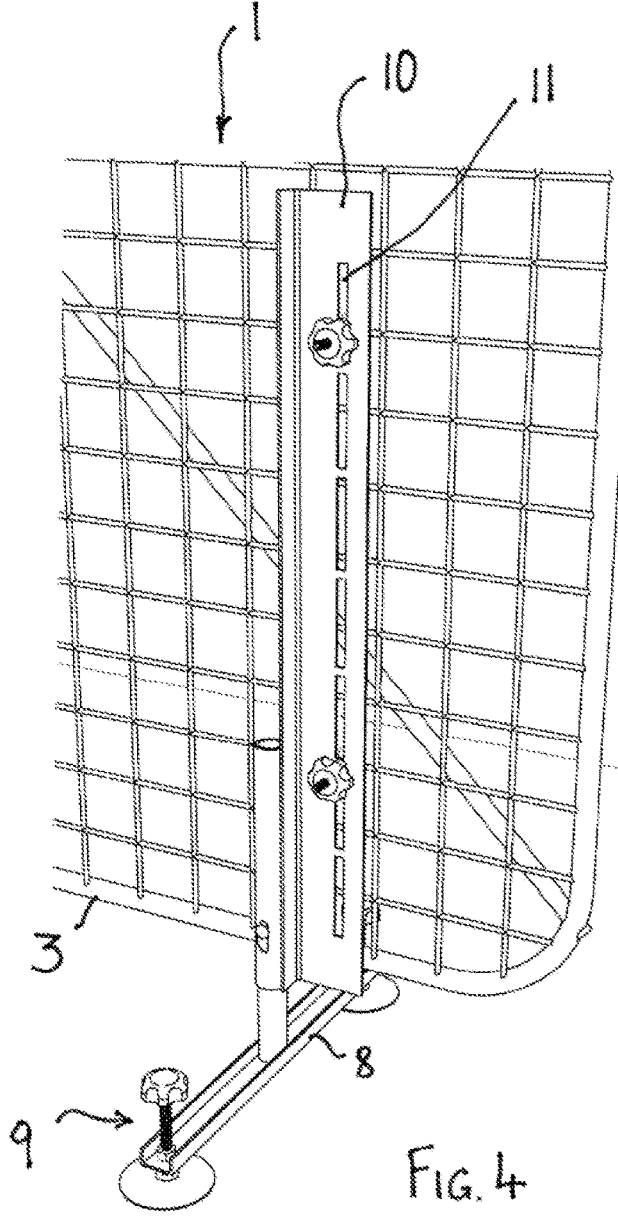
FIG. 4 is a perspective view of the gate holding device of FIG. 3 with its foot piece in the final position.

As seen in FIGS. 1-7, a gate holding device of a first embodiment is illustrated. A gate 1 is laid horizontally on the ground adjacent a post 2 from which the gate 1 is to be swung. The gate 1 has a frame 3 and a diagonal brace 4 (FIG. 3). The gate 1 is further reinforced by a sheet of steel mesh 5 which is welded to the frame 3 and brace 4. Two gate holding devices 7 are connected to the mesh 5 in a manner as will be explained hereafter.

Figure 7:
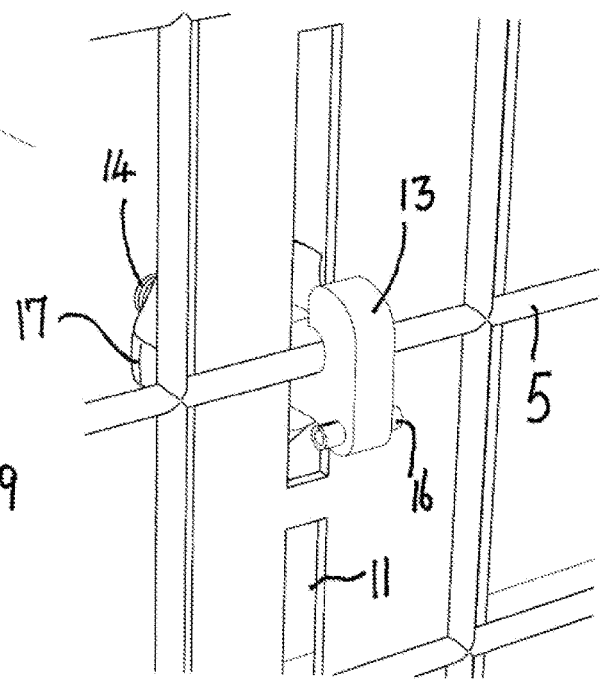
FIG. 7 is a perspective view from the other side of the gate showing the detail of the hooked attachment member.

Each of the gate holding devices 7 has a foot piece 8 which in FIG. 1 is illustrated in an initial position substantially parallel to the plane of the gate 1, and which in FIG. 2 is illustrated in a final position substantially perpendicular to the plane of the gate 1. Each foot piece 8 has a pair of threadably adjustable legs 9. As best seen in FIGS. 3-7, the gate holding device 7 has an elongate L-shaped attachment member 10 which is provided with a series of slots 11. There are two hook members 13 having threaded shanks 14 which pass through the slots 11. As best seen in FIG. 7, a roll pin 16 retains the corresponding hook member 13 in its slot 11. A handle 17 is engaged with each threaded shank 14.

The above described arrangement enables the hook members 13 to be engaged with the mesh 5 and the handle 17 rotated so as to threadably clamp the L-shaped member 10 to the mesh 5. In this way each gate holding device 7 is retained on the gate 1.

Figure 5:
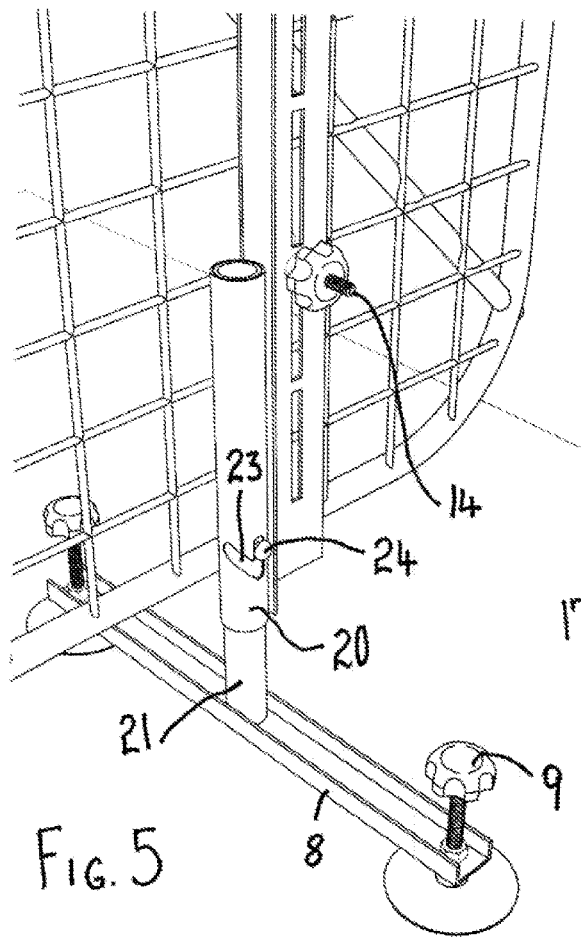
FIG. 5 is a perspective view from a different angle and to an enlarged scale of the gate holding device of FIG. 4.
Figure 6:
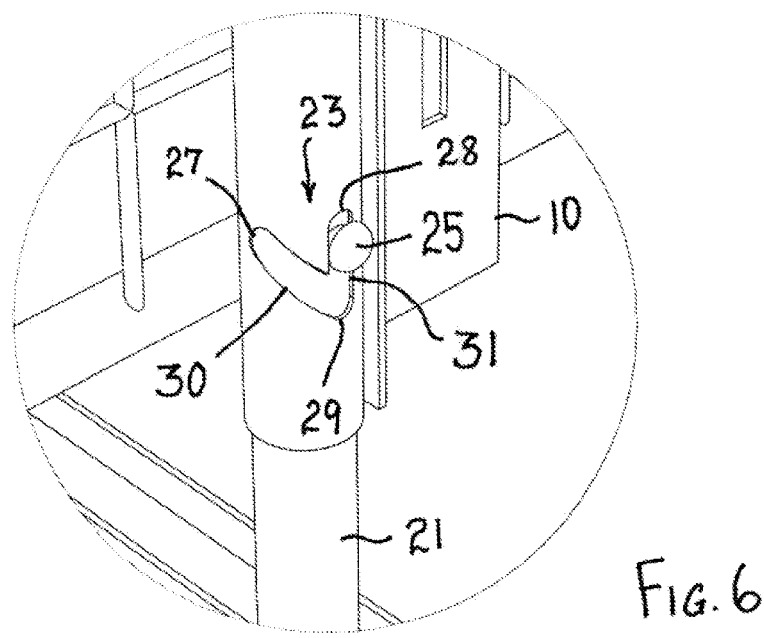
FIG. 6 is an enlarged view of the substantially V-shaped slot of the gate holding device of FIG. 5.

As best seen in FIGS. 5 and 6, a cylindrical hinge member 20 is welded to the L-shaped member 10 and is provided with a substantially V-shaped slot 23. A centrally located stub axle 21 extends from the foot piece 8 and is located in the cylinder 20. A pin 24 with a head 25 extends from the stub axle 21 through the V-shaped slot 23 and retains the foot piece 8 connected with the cylinder 20.

As best seen in FIG. 6, the substantially V-shaped slot 23 has a first end 27, a second end 28, and an elbow 29. The first end 27 and elbow 29 are interconnected by means of an inclined slot 30 and the second end 28 and elbow 29 are connected by means of a vertical slot 31.

The sequence of events involved in the swinging of the gate 1 from the post 2 is as follows. Firstly, the gate 1 is laid in a horizontal position on the ground adjacent the post 2 as illustrated in FIG. 1. Then the hook members 13 are used to secure two of the gate holding devices 7 to the mesh 5 in the position illustrated in FIG. 1. In this configuration the gate holding devices 7 have the foot pieces 8 in the initial position and thus the pin 24 is at the first end 27 of the V-shaped slot 23.

Next the gate 1 is lifted into the vertical position by the operator and held so that the foot pieces 8 and legs 9 are clear of the ground. As a consequence, the pin 24 slides down the inclined slot 30 under the action of gravity and reaches the elbow 29. This has the result that the foot pieces 8 rotate from the initial position illustrated in FIG. 1 into the final position illustrated in FIG. 2. Thereafter, the gate 1 can be lowered while still in the vertical position, the contact of the foot pieces 8 with the ground thereby moving each pin 24 upwardly from the elbow 29 along the vertical slot 31 to the second end 28. This locks the gate holding devices 7 into the position illustrated in FIG. 2.

In this position, the legs 9 can be rotated so as to adjust for any uneven nature of the ground adjacent the post 2. The legs 9 can also be rotated so as to adjust the gate 1 to the desired vertical height. In this position, the gate hardware, the gate 1 and the post 2 can be inter-engaged so as to connect the gate 1 to the post 2 in the desired fashion. That is, the gate holding devices 7 in the position illustrated in FIG. 2 enable the gate 1 to be swung from the post 2 by a single person.

Thereafter, the handles 17 can be rotated so as to release the hook members 13 from the mesh 5 and thus free the gate holding devices 7 from the gate 1. This completes the gate swinging installation.

As seen in FIGS. 8-14, a gate holding device of a second embodiment is illustrated. Again the gate 1 is laid horizontally on the ground adjacent the post 2 from which the gate 1 is to be swung. As for the first embodiment, the gate 1 has a frame 3 and a diagonal brace 4. The gate 1 is further reinforced by a sheet of steel mesh 5 which is welded to the frame 3 and brace 4. Two gate holding devices 57 are connected to the mesh 5 in a manner as will be explained hereafter.

Figure 8:
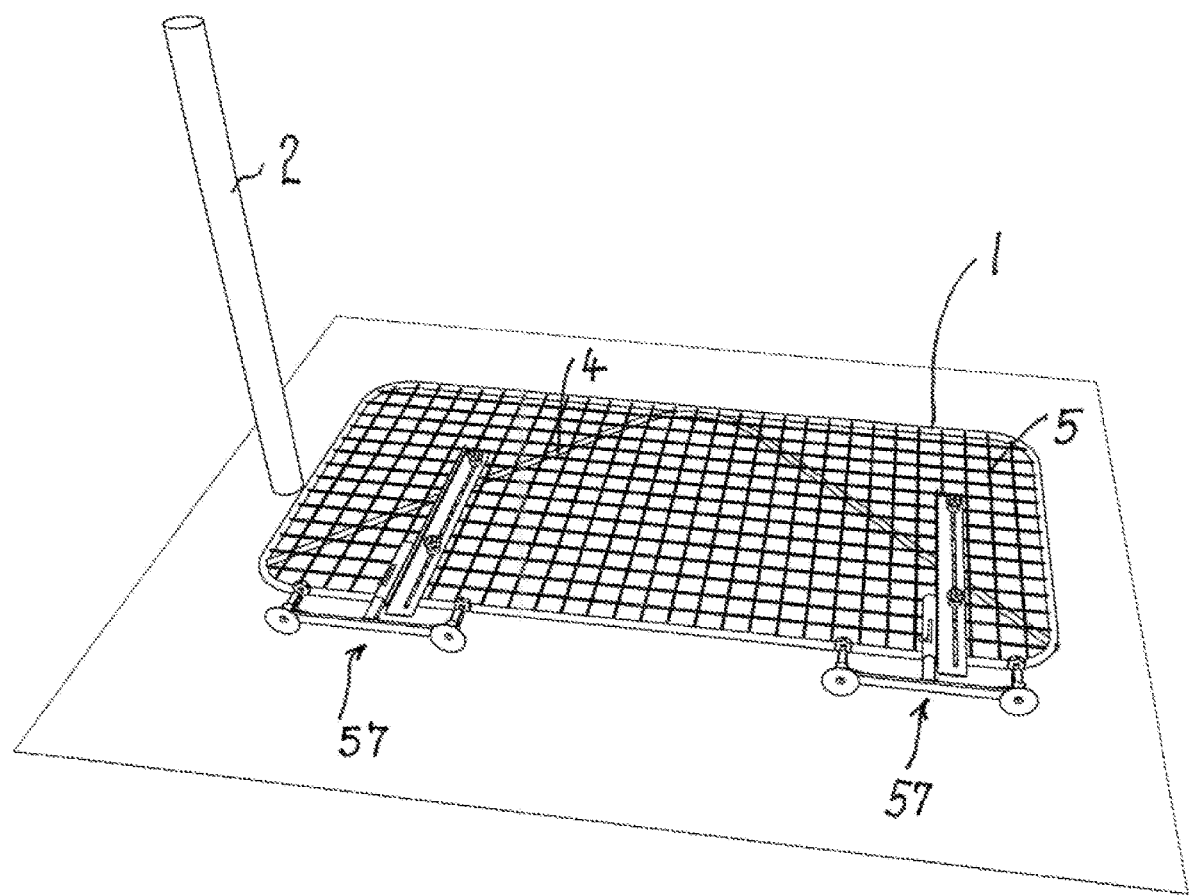
FIG. 8 is a perspective view of a gate to which two gate holding devices of a second embodiment are secured, the gate being in a horizontal position and the foot pieces being in the initial position.
Figure 9:
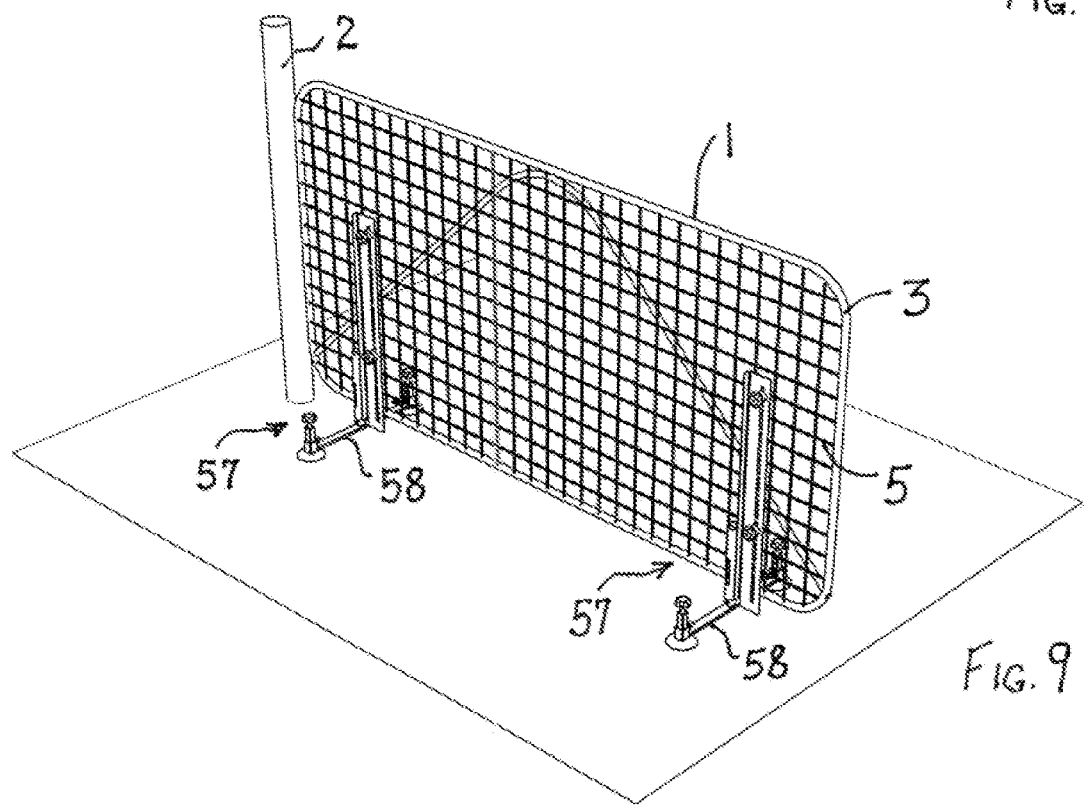
FIG. 9 is a perspective view of the gate of FIG. 8 in a vertical position and the foot pieces being in the final position.
Figure 14:
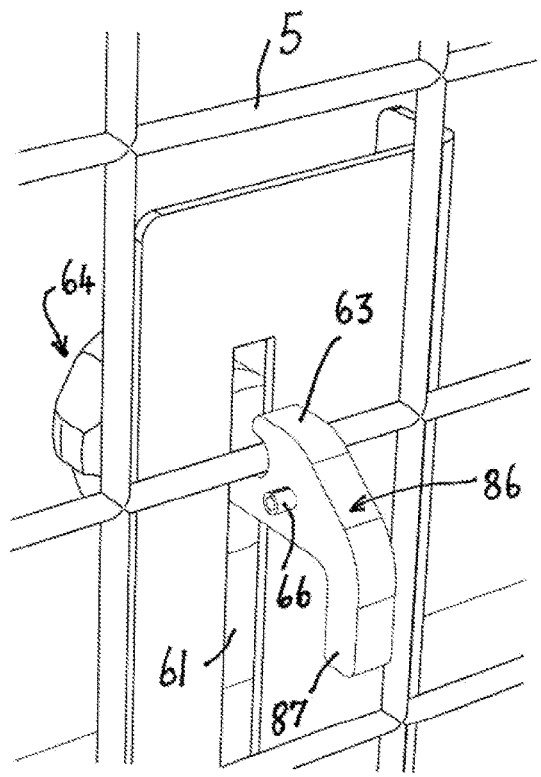
FIG. 14 is a perspective view from the other side of the gate showing the detail of the hooked attachment member.

Each of the gate holding devices 57 has a foot piece 58 which in FIG. 8 is illustrated in an initial position parallel to the plane of the gate 1, and which in FIG. 9 is illustrated in a final position substantially perpendicular to the plane of the gate 1. Each foot piece 58 has a pair of threadably adjustable legs 59. As best seen in FIGS. 10-14, the gate holding device 57 has an elongate L-shaped attachment member 60 which is provided with a series of slots 61. There are two hook members 63 having threaded shanks 64 which pass through the slots 61. As best seen in FIG. 14, a roll pin 66 retains the corresponding hook member 63 in its slot 61. A handle 67 is engaged with each threaded shank 64.

The above described arrangement enables the hook members 63 to be engaged with the mesh 5 and the handle 67 rotated so as to threadably clamp the L-shaped member 60 to the mesh 5. In this way each gate holding device 57 is retained on the gate 1.

Figure 12:
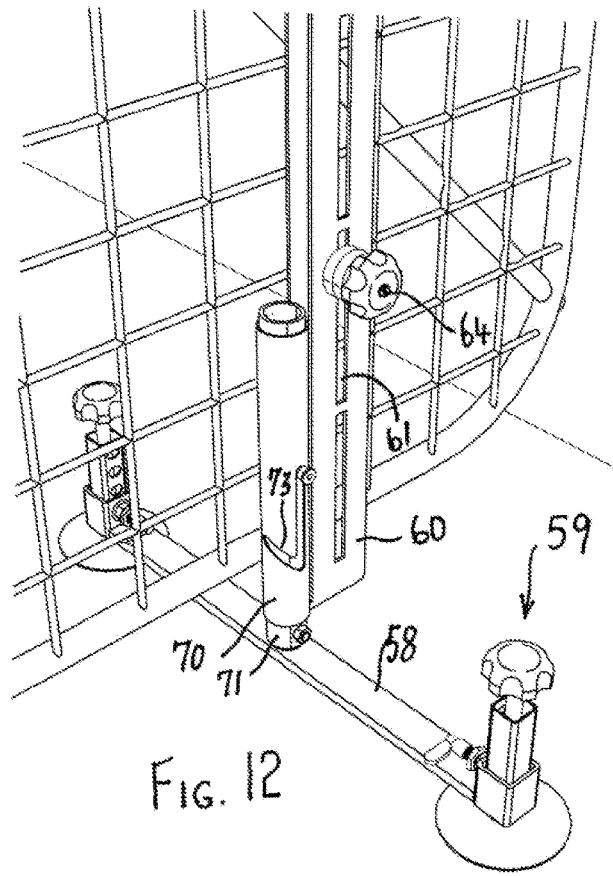
FIG. 12 is a perspective view from a different angle and to an enlarged scale of the gate holding device of FIG. 11.
Figure 13:
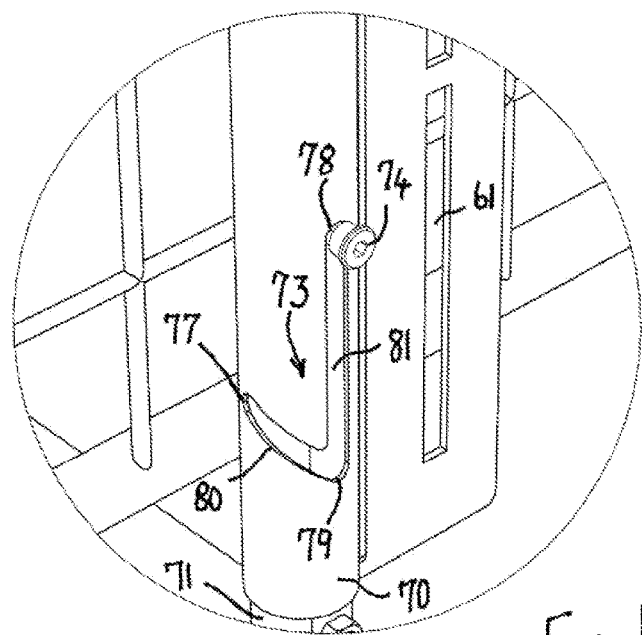
FIG. 13 is an enlarged view of the substantially V-shaped slot of the gate holding device of FIG. 12.

As best seen in FIGS. 12 and 13, a cylindrical hinge member 70 is welded to the L-shaped member 60 and is provided with a substantially V-shaped slot 73. A centrally located stub axle 71 extends from the foot piece 58 and is located in the cylinder 70. A pin 74 with a head 75 extends from the stub axle 71 through the V-shaped slot 73 and retains the foot piece 58 connected with the cylinder 70.

As best seen in FIG. 13, the substantially V-shaped slot 73 has a first end 77, a second end 78, and an elbow 79. The first end 77 and elbow 79 are interconnected by means of an inclined slot 80 and the second end 78 and elbow 79 are connected by means of a vertical slot 81.

The sequence of events involved in the swinging of the gate 1 from the post 2 is as follows. Firstly, the gate 1 is laid in a horizontal position on the ground adjacent the post 2 as illustrated in FIG. 8. Then the hook members 63 are used to secure the gate holding devices 57 to the mesh 5 in the position illustrated in FIGS. 8 and 14. In this configuration the gate holding devices 57 have the foot pieces 58 in the initial position and thus the pin 74 is in the first end 77 of the V-shaped slot 73.

Next the gate 1 is lifted into the vertical position by the operator and held so that the foot pieces 58 and legs 59 are clear of the ground. As a consequence, the pin 74 slides down the inclined slot 80 under the action of gravity and reaches the elbow 79. This has the consequence that the foot pieces 58 rotate from the initial position illustrated in FIG. 8 into the final position illustrated in FIG. 9. Thereafter, the gate 1 can be lowered while still in the vertical position. The contact of each foot piece 58 with the ground thereby moving the corresponding pin 74 upwardly from the elbow 79 along the vertical slot 81 to the second end 78. This locks each of the gate holding devices 57 into the position illustrated in FIG. 9.

Figure 15:
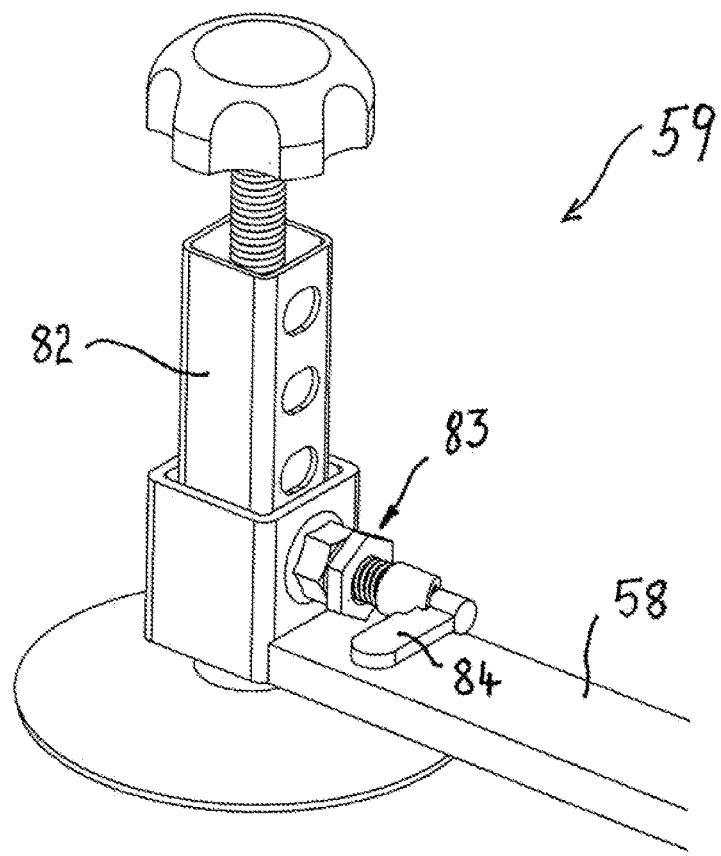
FIG. 15 is a perspective view to an enlarged scale of one end of the foot piece of the second embodiment.

In this position, the threaded legs 59 can be rotated so as to adjust for any uneven nature of the ground adjacent the post 2. The legs 59 pass through an aperture sleeve 82 as best seen in FIG. 15. The sleeve 82 is connected to the foot piece 58 by a spring loaded plunger 83 having a flip over handle 84. The position of the plunger 83 can be selected so as to provide for a coarse adjustment of the gate 1 relative to the ground. The threaded legs 59 can also be rotated so as to provide a fine adjustment of the vertical height of the gate. The combination of the coarse adjustment and the fine adjustment enable the gate to be placed into the desired position very quickly. In this desired position, the gate hardware, the gate 1 and the post 2 can be inter-engaged so as to connect the gate 1 to the post 2 in the desired fashion. That is, the gate holding devices 57 in the position illustrated in FIG. 9 enable the gate 1 to be swung from the post 2 by a single person.

Thereafter, the handles 67 can be rotated so as to release the hook members 63 from the mesh 5 and thus free the gate holding devices 57 from the gate 1. This completes the gate swinging installation.

Figure 16:
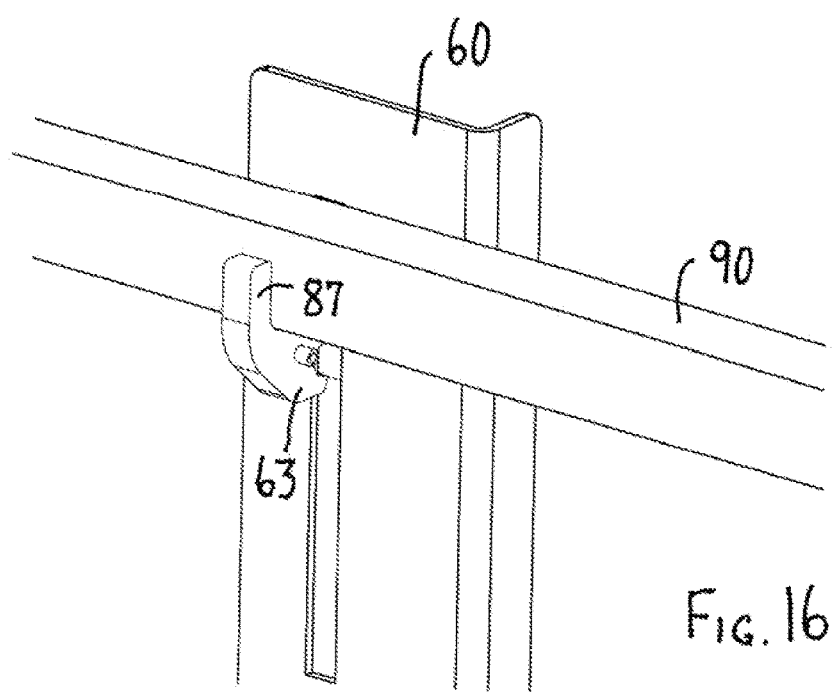
FIG. 16 is a perspective view showing a gate holding device of the second embodiment being secured to a gate with horizontal bars.

As seen in FIG. 16, the hook members 63 are provided with a generally T-shaped head 86 which in addition to the hook 63 facing in one direction, has an L-shaped hook 87 facing in the opposite direction. The L-shaped hook 87 can be engaged with the horizontal bars 90 of an equestrian gate (not illustrated). Thus the hook members 63 of the second embodiment are able to be engaged with gates provided with mesh 5 and gates provided with horizontal bars 90.

A further embodiment is illustrated in FIGS. 17-19. In the further embodiment the L-shaped member 10 with its hook members 13 is as for the first embodiment. The cylinder 20 and stub axle 21 of the first embodiment are modified so that the further embodiment has a cylinder 120 and a stub axle 121 which are interconnected by means of a helical torsion spring 122 which is arranged to swing the foot piece 8 from the initial position to the final position. A spring loaded lock 135 (in the form of a location latch or pull pin) is provided to lock the stub axle 121 in the initial position. The spring loaded lock 135 has a shaft 136 having a handle 137 and a locating thread 138. The handle 137 engages a collar 140 having an inclined ramp 141. The shaft 136 passes through the cylinder 120 and is capable of engaging the stub axle 121 when the handle 137 is manipulated so as to move it down the inclined ramp 141 and into a position rotated by 180° from that illustrated in FIGS. 8-10.

The gate holding devices of the further embodiment are connected to the gate 1 in the same way as for the first embodiment, however, the foot pieces 8 are swung into the initial position and locked there by manipulating the handle 137 prior to connecting the gate holding devices to the gate 1. After the gate 1 is lifted into the vertical position illustrated in FIG. 2, each of the handles 137 is manipulated so as to release the spring loaded lock 135 and thereby permit the torsion spring 122 to turn the corresponding foot piece 8 into the final position.

Figure 20:
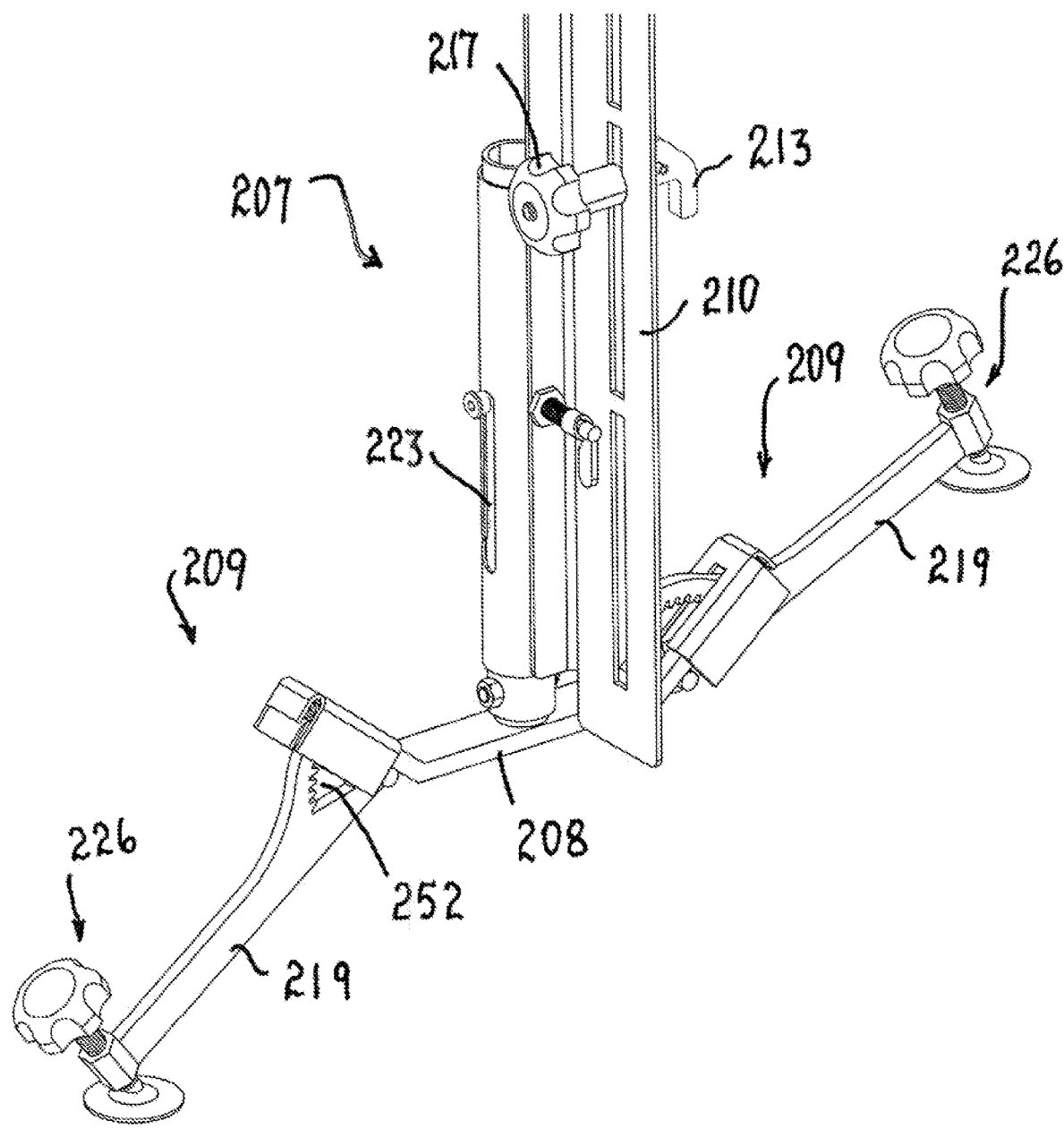
FIG. 20 is a perspective view of the foot piece of a gate holding device of a still further embodiment including a foot adjustment mechanism.
Figure 21:
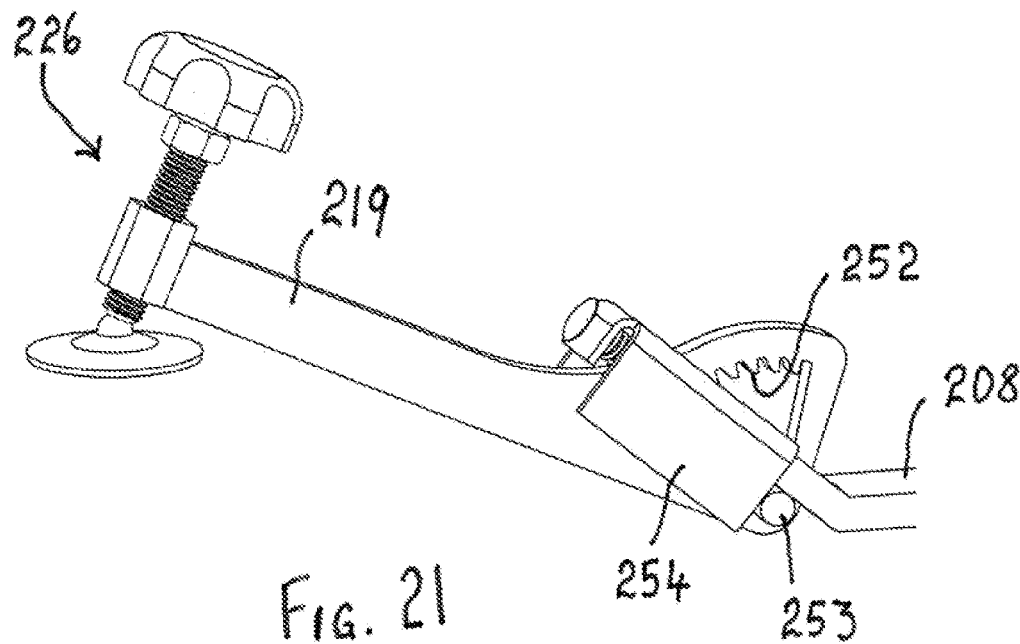
FIG. 21 is an enlarged perspective view of the foot adjustment mechanism of FIG. 20.
Figure 22:
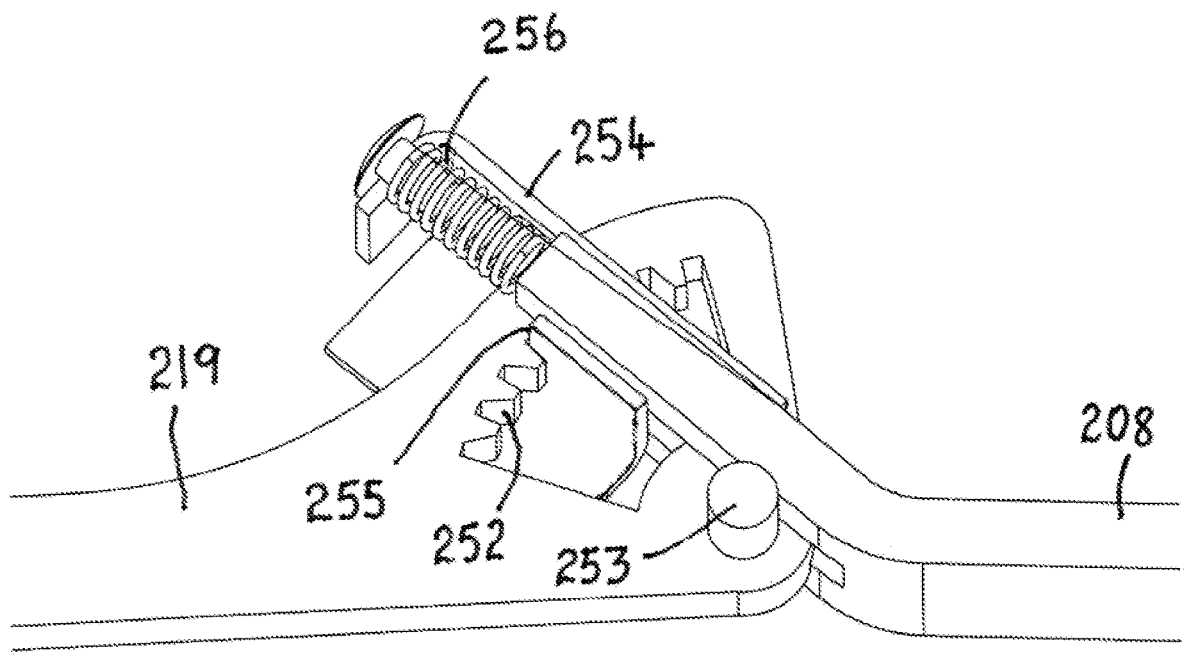
FIG. 22 is a cutaway perspective view showing the interior of the adjustment mechanism of FIG. 21.

Turning now to FIGS. 20-22, in a further embodiment, a gate holding device 207 has its L-shaped member 210, hook member 213, handle 217, V-shaped slot 223 and foot piece 208 substantially as before. However, the extremities of the foot piece 208 are each provided with a foot operable height adjustment mechanism 209. The mechanism 209 takes the form of an outer leg 219 with its own fine threaded adjustment 226 and a coarse adjustment provided by a vertically positioned ratchet having a plurality of ratchet teeth 252 which are arranged in a vertical arc. The outer leg 219 is pivoted to the foot piece 208 by means of an axle 253 (FIG. 22).

As best seen in FIGS. 21 and 22, the ratchet is contained within a folded sheet metal housing 254 which has one sidewall bent inwardly so as to form a pawl 255. The foot piece 208 is bifurcated at its distal end and a helical spring 256 is captured between the distal end of the foot piece 208 and the housing 254. The spring 256 urges the pawl 255 into engagement with the ratchet teeth 252.

By pressing the end of the housing 254 with his foot, an operator can disengage the pawl 255 from the ratchet teeth 252 and thereby set the desired coarse adjustment. FIG. 20 illustrates the extreme ends of the adjustment so that the gate holding device 207 can be visualised as being vertically located on a slope in which the high ground is to the right in FIG. 20. Being able to use the foot to release the ratchet mechanism enables the adjustment take place whilst the operator is holding the gate 1 in both hands.

Figure 23:
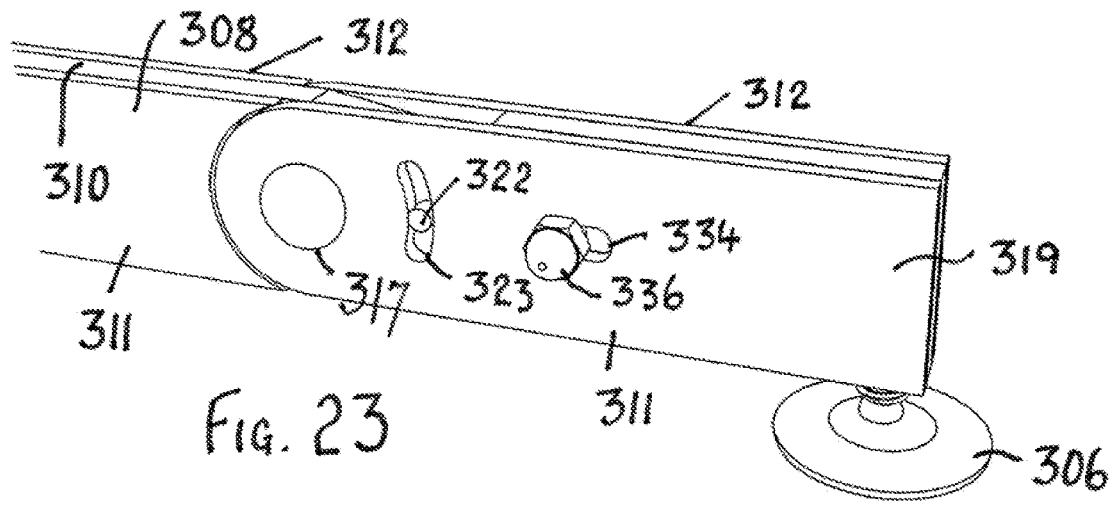
FIG. 23 is a perspective view of a further embodiment of a foot adjustment mechanism.
Figure 24:
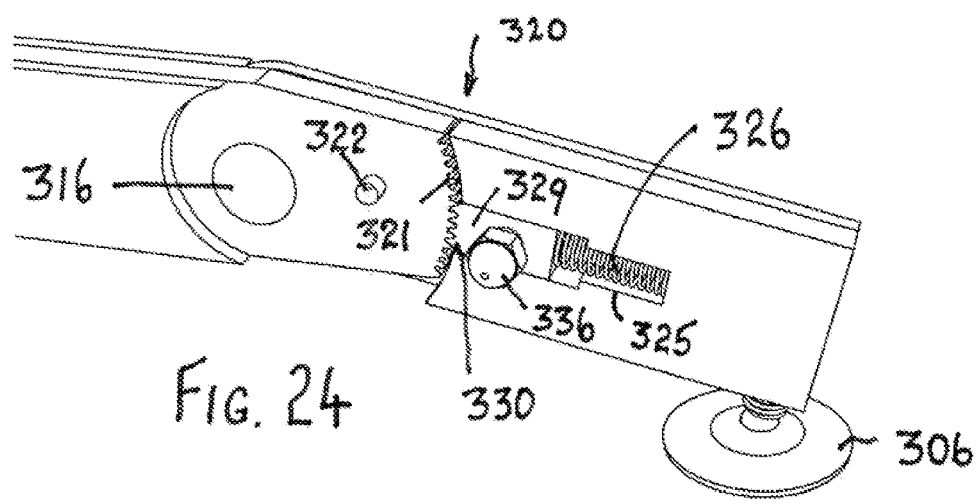
FIG. 24 is a cutaway perspective view of the foot adjustment mechanism of FIG. 23.

As seen in FIGS. 23 and 24, in a further embodiment, the foot piece 308 has a central rigid core 310 and is provided with two outer covers 311, 312. In FIG. 24, the cover 311 is omitted in order to reveal the interior workings. The outer leg 319 carries a tip 306. The core 310 has a pivot axle 316 which is received in two holes 317 in the outer covers 311, 312. Only the hole 317 in the outer cover 311 is visible in FIG. 23. The arrangement of the pivot axle 316 and the hole 317 enables the outer leg 319 to pivot relative to the foot 308 as best seen FIG. 24. A ratchet mechanism 320 extends between the foot 308 and outer leg 319.

As seen in FIG. 24, the rigid core 310 includes a plurality of ratchet teeth 321 which are arranged in a vertical arc. In addition, the rigid core 310 includes a limiting or locating pin 322 which extends through the core 310 and is captured in an arcuate slot 323 in each of the covers 311, 312. Only the arcuate slot 323 in the cover 311 is visible in FIG. 23. The longitudinal extent of the arcuate slot 323 determines the limit of the pivoting action between the foot 308 and outer leg 319.

As also seen in FIG. 24, the core 310 of the outer leg 319 has a stepped recess 325 within which is located, and trapped, a helical compression spring 326. One end of the spring 326 is located at the bottom of the recess 325 whilst the other end of the spring 326 abuts a pawl 329. The pawl 329 is slidably mounted in the recess 325 and has a plurality of teeth 330 which are sized and spaced to engage with the ratchet teeth 321. Extending from the pawl 329 is a threaded rod which passes through a longitudinal slot 334 (FIG. 23) in the outer cover 311 of the outer leg 319. This threaded rod is provided with a domed cap 336. The action of the spring 326 is to urge the pawl 329 so as to engage the teeth 330 with the teeth 321. This is the position illustrated in both FIG. 23 and FIG. 24. The domed cap 336 is able to be moved by the operator's foot, towards the tip 306, thereby disengaging the teeth 321, 330. This unlocks the ratchet mechanism 320 and permits the outer leg 319 to pivot about the pivot axle 316 into a new position. Thereafter the domed cap 336 is released and the teeth 321, 330 re-engage to lock the ratchet mechanism 320 in the new position.

Figure 25:
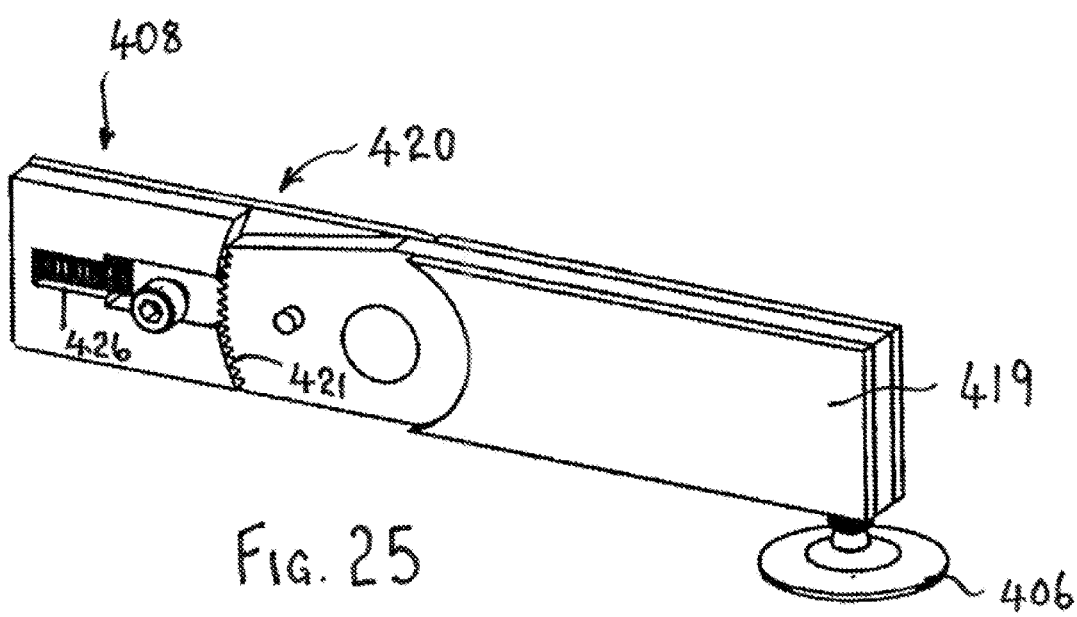
FIG. 25 is a cutaway perspective view of a mirror image alternative embodiment to that of FIGS. 23 and 24.

A still further mirror image embodiment is illustrated in FIG. 25 in which the foot 408 is provided with the recess 425 and the outer leg 419 is provided with the ratchet teeth 421. That is to say, the ratchet mechanism 420 is reversed in FIG. 25 relative to FIGS. 23 and 24. The outer cover on the foot 408 is omitted in FIG. 25 in order to reveal the interior of the ratchet mechanism 420.

Either of the above described arrangements enable the outer leg 319, 419 to be adjusted in order to take into account any unevenness of ground under the gate 1. In particular, the size of the teeth 321, 330 can be adjusted to adjust the size of the increments available by means of the ratchet mechanism 320.

The foregoing describes only some embodiments of the present invention and modifications, obvious to those skilled in the rural arts, can be made thereto without departing from the scope of the present invention. The described embodiments enable a single person to move the gate 1 from a horizontal position as illustrated in FIG. 1 into the vertical position as illustrated in FIG. 2 and hold it there without a human assistant.

The term "comprising" (and its grammatical variations) as used herein is used in the inclusive sense of "including" or "having" and not in the exclusive sense of "consisting only of".

The invention claimed is:

1. A gate holding device for holding an agricultural gate during installation, said device comprising an elongate attachment member defining a first axis and having a first hinge member connected thereto adjacent a lower end of said attachment member, an elongate foot piece defining a second axis substantially perpendicular to said first axis and having a second hinge member connected to said foot piece intermediate the ends thereof and perpendicular to said second axis, said first and second hinge members being connected together to permit rotation of said foot piece relative to said attachment member between an initial position where said foot piece is substantially parallel to said gate and a final position in which said foot piece is substantially perpendicular to said gate.

2. The device as claimed in claim 1 wherein said hinge members comprise a stub axle and a sleeve, said sleeve having a substantially V-shaped slot therein and said stub axle having a projecting pin retained in said slot, said pin being at, or adjacent to, a first end of said slot when said foot piece is in said initial position, and being at, or adjacent to, a second end of said slot when said foot piece is in said final position.

3. The device as claimed in claim 2 wherein said stub axle is on said foot piece and said sleeve is on said attachment member.

4. The device as claimed in claim 3 wherein said substantially V-shaped slot is arranged in an upright position on said sleeve.

5. The device as claimed in claim 3 wherein said foot piece has two ends and a height adjuster at each of said ends.

6. The device as claimed in claim 2 wherein said substantially V-shaped slot is arranged in an upright position on said sleeve.

7. The device as claimed in claim 6 wherein each said height adjuster includes a threaded engagement between an adjustment bolt and a female threaded portion of said foot end.

8. The device as claimed in claim 7 wherein each said height adjuster includes a coarse adjustment and a fine adjustment, said threaded engagement providing said fine adjustment.

9. The device as claimed in claim 8 wherein said coarse adjustment is provided by an apertured sleeve which is engaged with a spring loaded plunger.

10. The device as claimed in claim 6 wherein said height adjuster comprises two members pivotably interconnected with each other, one of said members including a ratchet mechanism having a plurality of ratchet teeth able to be arranged in a substantially vertical arc, and the other of said members having a pawl engageable with said teeth, said teeth and pawl being urged into said engagement by a resilient means to thereby lock said ratchet mechanism.

11. The device as claimed in claim 10 wherein said resilient means has a foot operable projection which is movable to retract said pawl from said teeth and thereby unlock said ratchet mechanism.

12. The device as claimed in claim 6 wherein said foot piece has two ends and a height adjuster at each of said ends.

13. The device as claimed in claim 2 wherein said foot piece has two ends and a height adjuster at each of said ends.

14. The device as claimed in claim 1 wherein said foot piece has two ends and a height adjuster at each of said ends.

15. The device as claimed in claim 1 wherein said gate has a body of mesh and said attachment member includes a plurality of hooks shaped to releasably engage said mesh.

16. The device as claimed in claim 15 wherein said hooks are shaped to engage either with said mesh or with horizontal bars.

17. The gate holding device as claimed in claim 1 wherein a spring means is operatively interposed between said first and second hinge members to urge said foot piece into said final position.

18. The gate holding device as claimed in claim 17 and further including a lock means to retain said foot piece in said initial position.

19. A method of holding an agricultural gate during installation, said method comprising the steps of:
attaching at least one gate holding device as defined in claim 1 to an agricultural gate lying in a substantially horizontal plane on ground adjacent a gate post, the foot piece of each of said gate holding device(s) being in said initial position,
raising said agricultural gate into a substantially vertical plane with said foot piece(s) clear of said ground,
moving the foot piece of each of said gate holding device(s) into said final position, and lowering said agricultural gate to engage said foot piece(s) with said ground.

20. The method as claimed in claim 19 and incorporating a spaced apart pair of said gate holding devices.

* * * * *